Patented Jan. 19, 1954

2,666,835

UNITED STATES PATENT OFFICE 2,666,835

ELECTRIC RESISTANCE WELDING PROCESS

Albert J. Elleman, London, England, assignor to Imperial Chemical Industries Limited, a corporation of Great Britain No Drawing. Application July 24, 1951, Serial No. 238,373

9 Claims. (Cl. 219—10)

This invention relates to a process of electric resistance welding metal parts which have been coated with paint or lacquer.

In electric resistance welding the metal parts to be joined are pressed together and a heavy current is passed from one metal part to the other through the area of contact. The electrical resistance of the contact results in heat being generated there and when the metal has been raised to a sufficiently high temperature the parts become welded together.

It is frequently desirable to coat the metal parts prior to welding with a paint or lacquer, e. g. an anticorrosive primer, but it is found that the film of coating material seriously interferes with the electric resistance welding process. This is due to the fact that the film of coating material has a high electrical resistance and in fact, at the low voltages used in the welding process, is a very good insulator. As a result no current can be passed through the metal parts and so no heat is developed. It is known to reduce the electrical resistance of coating compositions by adding a conductive material such as powdered zinc, copper, silver or carbon black but the high proportion of these materials required to give the necessary low electrical resistance results in the coating composition having very poor protective properties. In practice the only satisfactory solution of this welding problem has been to remove the coating film in the area to be welded prior to pressing the parts together.

We have now found that certain types of coating material have an electrical resistance low enough to permit electric resistance welding of metal parts coated with such material. The present invention provides a process of electric resistance welding metal parts which have been coated with a paint or lacquer containing a substantially non-oxidised magnetic metal powder. In a preferred form of the invention the metal powder is one possessing magnetic remanence.

The advantage to be derived from the invention may be illustrated as follows:

A standard zinc chromate anticorrosive primer was modified by the addition of:

(i) Zinc powder
(ii) Brass powder
(iii) Stainless steel powder
(iv) Soft iron powder
(v) Nickel powder the proportion of metal powder being in each case 13.8% by volume of the solids of the primer. The powder was thoroughly stirred into the primer, metal panels were coated with it and the electrical resistance of the dried film was measured between electrodes $\frac{1}{16}''$ in diameter. The results were:

Table I

| Film composition | Film resistance, milliohms/thou |
| --- | --- |
| Unmodified primer | >50,000 |
| Primer+zinc | 25,000 |
| Primer+brass | 25,000 |
| Primer+stainless steel | 30,000 |
| Primer+soft iron | 3,000 |
| Primer+nickel | 30 |

The term "thou" is a measurement of the thickness of the paint film, and is an abbreviation of a thousandth of an inch.

It is believed that the relatively very low resistances obtained when soft iron or nickel are present in the paint film is due to the fact that the metal particles, by reason of their inherent magnetic properties, link together to form conductive chains in the paint film. The difference between the soft iron and nickel figures may be due to the presence on the soft iron particles of a thin layer of oxide. That this will affect the conductivity of a chain of the particles may be shown by measuring the resistance of the powders after being compacted under pressure in tubes. Whereas the resistances of soft iron and nickel in bulk are almost identical, the compacted iron powder had a resistance of 1500 ohms/cm.$^3$ and the compacted nickel powder had a resistance of 0.03 ohms/cm.$^3$. The conductivity of a paint film containing soft iron powder may be increased by reducing any oxide film on the powder before incorporating it in the paint. Other magnetic metals suitable for the purpose of this invention are steel and alloys such as Permalloy and Alnico.

Mere stirring in of the metal powder, although giving a useful indication of the properties of the composition, is not sufficient to produce a satisfactory paint or lacquer since the powder is inadequately dispersed. Large aggregates remain and since these affect the can stability of the composition and give rise to roughness in the paint film it is necessary to ballmill or otherwise thoroughly disperse the powder in the paint. We have found that although thorough dispersion of the powder in the paint results in a decrease in the conductivity of the paint film, the conductivity of the film may be increased, in some cases very markedly, by subjecting the liquid paint to a magnetic field. The effect on the electrical resistance of the film of applying a magnetic field to the liquid paint is shown in Table II.

*Table II*

| Percent vol. nickel in dry film | Magnetising field in gauss | | | |
| --- | --- | --- | --- | --- |
| | 0 | 75 | 148 | 271 |
| 20.0 | 11 | 5 | 2.5 | .2 |
| 15.0 | 30 | 13 | 4 | 2 |
| 10.0 | 130 | 23 | 7 | 4 |
| 7.5 | 154 | 32 | 18 | 15 |

The resistances of the films are expressed in milliohms/thou.

The improvement is most marked with metals such as nickel which possess the property of magnetic remanence and in general it has been found that the higher the degree of magnetic remanence the more suitable is the metal powder for the purpose of this invention. However even magnetic metals with zero remanence give films much more conductive than those containing a non-magnetic metal. For example a paint film containing a nickel-iron alloy of zero remanence had an electrical resistivity of 2,500 milliohms/thou, i. e. only one tenth of the resistance of a similar paint film containing zinc powder.

The effect of varying the proportion of magnetic metal powder also is shown in Table II, and in fact the paint film may contain up to 30% by volume of magnetic metal without its protective properties being adversely affected.

Experiment has shown that in the case of "straight time" spot welding satisfactory welds can be obtained if the film of paint or lacquer has a resistance, as measured over the area of the electrodes, of not more than 60 or 70 milliohms/thou, the thickness of the film being from 1–2 thou. Table II indicates that in the case of the primer modified with nickel powder satisfactory welds will be obtained if the primer contains as little as 7.5% nickel by volume of the primer solids. Treatment of the modified primer with a magnetic field makes possible the use of a smaller proportion of nickel powder. In the case of "potential time" spot welding satisfactory welds can be obtained if the film of paint or lacquer has a resistance, as measured over the area of the electrodes, of as much as 5,000 milliohms/thou. Even in this case however, Table I indicates that the primer modified with zinc powder would be unsuitable.

The conductivity is also influenced by the size and shape of the particles of the powdered metal and I have found that the lower the apparent density of the powder, the lower is the electrical resistivity of the paint film.

The apparent density of the powders was determined by placing a sample in a graduated tube and centrifuging for five minutes at 780 g., the weight of the sample and its apparent volume then being measured. The effect of this factor is illustrated in Table III.

*Table III*

| Apparent density nickel powder | Coating composition I | | Coating composition II | | Coating composition III | |
| --- | --- | --- | --- | --- | --- | --- |
| | Vol. percent Ni in dry film | Milliohms/thou | Vol. percent Ni in dry film | Milliohms/thou | Vol. percent Ni in dry film | Milliohms/thou |
| 2.70 | 15.0 | 38 | 15.0 | 200 | 17.5 | 27 |
| 1.92 | 15.0 | 20 | 15.0 | 53 | 17.5 | 15 |
| 1.17 | 15.0 | 8 | 15.0 | 11 | 17.5 | 3 |
| 0.86 | 15.0 | 6 | 15.0 | 5 | 17.5 | 2.5 |

The volume percentage of nickel in the dry film was calculated on the real density 8.9 of nickel, and in general, I have found that for the purpose of this invention magnetic metal powders with a ratio of real density to apparent density (as measured above) of greater than 4:1 give better results.

Experiments carried out on welds made on plain steel and welds made according to the process of this invention showed no significant changes either in the welding process or in the shear strength of the welds. Oscilloscope traces of the welding current showed no variation in character between welding the plain and painted steel and shear strength tests on the welds gave the following results:

*Table IV*

| Type of metal welded | Mean shear load/spot (lbs.) |
| --- | --- |
| Plain steel | 1,019 |
| Alkyd base primed | 1,015 |
| Bitumen base primed | 1,005 |

These indicate that the paint film has no significant effect on the strength of the weld.

What I claim is:

1. A process for the electric resistance welding of protectively precoated metal parts in which the coating is dry which comprises reducing the electrical resistance of the coating by incorporating in intimate admixture in the coating composition a non-oxidized magnetic metal powder, pressing the said coated metal parts together to provide a contact area and passing an electric current through the area of contact.

2. A process as recited in claim 1 in which the magnetic metal powder possesses a low apparent powder density.

3. A process as recited in claim 1 in which the magnetic metal powder possesses magnetic remanence.

4. A process as recited in claim 1 in which the magnetic metal powder is present in the coating composition in a substantial amount not exceeding 30%.

5. A process as recited in claim 4 in which the magnetic metal powder possesses magnetic remanence.

6. A process as recited in claim 1 in which the magnetic metal powder is soft iron.

7. A process as recited in claim 1 in which the magnetic metal powder is nickel.

8. A process for the electric resistance welding of protectively precoated metal parts in which the coating is dry which comprises coating the metal parts with a protective coating composition containing in intimate admixture a non-oxidized magnetic metal powder, drying the coating, pressing the dry coated metal parts together to provide a contact area and passing an electric current through the area of contact.

9. A process as recited in claim 8 in which the coating composition is subjected to a magnetic field prior to the drying of the coating composition.

ALBERT J. ELLEMAN.

References Cited in the file of this patent

UNITED STATES PATENTS

| Number | Name | Date |
|---|---|---|
| 2,375,178 | Ruben | May 1, 1945 |
| 2,510,727 | Sussenbach | June 6, 1950 |

FOREIGN PATENTS

| Number | Country | Date |
|---|---|---|
| 136,998 | Great Britain | Dec. 31, 1919 |
| 340,705 | Great Britain | Jan. 8, 1931 |